(12) United States Patent
Lord

(10) Patent No.: US 11,055,622 B2
(45) Date of Patent: Jul. 6, 2021

(54) DATA STORAGE APPARATUS WITH SELECTIVE ADAPTIVE PREDICTIVE BEHAVIOR

(71) Applicant: Quantum Corporation, San Jose, CA (US)

(72) Inventor: Stephen Lord, Prior Lake, MN (US)

(73) Assignee: Quantum Corporation, San Jose, CA (US)

(*) Notice: Subject to any disclaimer, the term of this patent is extended or adjusted under 35 U.S.C. 154(b) by 1595 days.

(21) Appl. No.: 14/728,497

(22) Filed: Jun. 2, 2015

(65) Prior Publication Data

US 2016/0358076 A1    Dec. 8, 2016

(51) Int. Cl.
*G06F 12/00* (2006.01)
*G06N 7/00* (2006.01)
*G06F 11/00* (2006.01)
*G06F 3/06* (2006.01)

(52) U.S. Cl.
CPC ............ *G06N 7/005* (2013.01); *G06F 3/061* (2013.01); *G06F 3/064* (2013.01); *G06F 3/0617* (2013.01); *G06F 3/0619* (2013.01); *G06F 3/0649* (2013.01); *G06F 3/0689* (2013.01); *G06F 11/00* (2013.01)

(58) Field of Classification Search
CPC ................................. G06N 5/02; G06N 7/005
See application file for complete search history.

(56) References Cited

U.S. PATENT DOCUMENTS

| | | | | |
|---|---|---|---|---|
| 2001/0001146 A1* | 5/2001 | Petersen | ............ | G06Q 10/087 705/26.8 |
| 2002/0143597 A1* | 10/2002 | Andre | ............ | G06Q 10/06311 705/7.14 |
| 2008/0005480 A1* | 1/2008 | Lubbers | ............ | G06F 12/0862 711/137 |
| 2008/0005736 A1* | 1/2008 | Apacible | ............ | G06F 9/4843 718/100 |
| 2009/0055595 A1* | 2/2009 | Gill | .............. | G06F 12/0862 711/137 |
| 2012/0185727 A1* | 7/2012 | Yoon | ............. | G06F 11/1438 714/15 |
| 2012/0324191 A1* | 12/2012 | Strange | ............. | G06F 11/008 711/165 |

* cited by examiner

Primary Examiner — Gurtej Bansal
(74) *Attorney, Agent, or Firm* — Eschweiler & Potashnik, LLC

(57) ABSTRACT

Example apparatus and methods concern selective adaptive predictive data placement to improve the operating and/or electrical efficiency of a data storage apparatus. A future input/output operation is predicted from a current input/output operation, the state of the data storage apparatus, relationships between data currently being processed and data previously processed, environmental factors, or other factors. The apparatus and methods may improve data storage efficiency by selectively pre-fetching data, relocating data on the data storage apparatus or within a plurality of data storage apparatus, speculatively producing erasure codes or other error correction codes, speculatively deduplicating data, or other adaptive functions. Relocation and pre-fetching may be configured to achieve different policies focused on electrical efficiency, operating efficiency, use spreading, or other considerations.

35 Claims, 10 Drawing Sheets

DATA STORAGE APPARATUS WITH SELECTIVE ADAPTIVE PREDICTIVE BEHAVIOR

BACKGROUND

A data storage apparatus (DSA) stores data. The data stored by the DSA may be organized in files, objects, records, tables, byte-streams, or in other ways. In the early days of computing, a DSA may have had a single location in which data could be stored. For example, a tape may have had one length of recording media, a floppy disk may have had one spinning platter, and a hard disk may have had one spinning platter. While the recording media or spinning platter may have been partitioned or organized in various ways, there was only a single physical storage media. When data was going to be read, there was only one place from which the data could be read. Additionally, when data was to be stored, there was only one physical location to which that data could be stored. Since there was only one place from which data could be read and one place to which data could be stored, all data may have been treated the same even though different parts of a disk platter may have different costs to use. For example, an outer edge of a platter may have a higher data rate than inner parts of the platter. Other data storage devices may have other characteristics that differ.

As computing progressed, computers may have interacted with multiple DSA. For example, a computer may have had a tape drive, a floppy drive, and a hard disk drive. Decisions concerning where to store any particular data had to be made by the user of the computer, either explicitly when the data was stored, or implicitly by configuring a program or utility. Similarly, decisions concerning where data was to be read from had to be made by the user of the computer. File systems and operating systems facilitated virtualizing the storage devices and removed some of the decision making from the computer users. As computing progressed further, multiple processes were able to run on a single computer. Thus, multiple actors may have required decisions concerning from where data was to be read and to where data was to be stored. Once again, decisions concerning where to read or store any particular data had to be made by the user, either explicitly or implicitly. File systems and operating systems removed some of this complexity from the users.

As computing progressed further, computers may have interacted with computer networks. At this point in time the locations available to store data expanded exponentially. Thus, the locations available for reading data also expanded exponentially. Still, the decision concerning where any particular piece of data was located or was to be stored was either made explicitly by a user on an as-needed basis, or was made implicitly by configuring a program with certain preferences.

In today's computing environment, there may be a large number of locations in which data can be stored and thus a large number of locations from which data can be read. The different locations may have different properties (e.g., energy efficiency, cost, write time, read time, capacity, security). Even as the number and variety of locations available to store data has expanded, the paradigm for selecting the location for any particular piece of data may have lagged despite the efforts of programmers to optimize behavior. Thus, some inefficiencies in data storage may remain.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
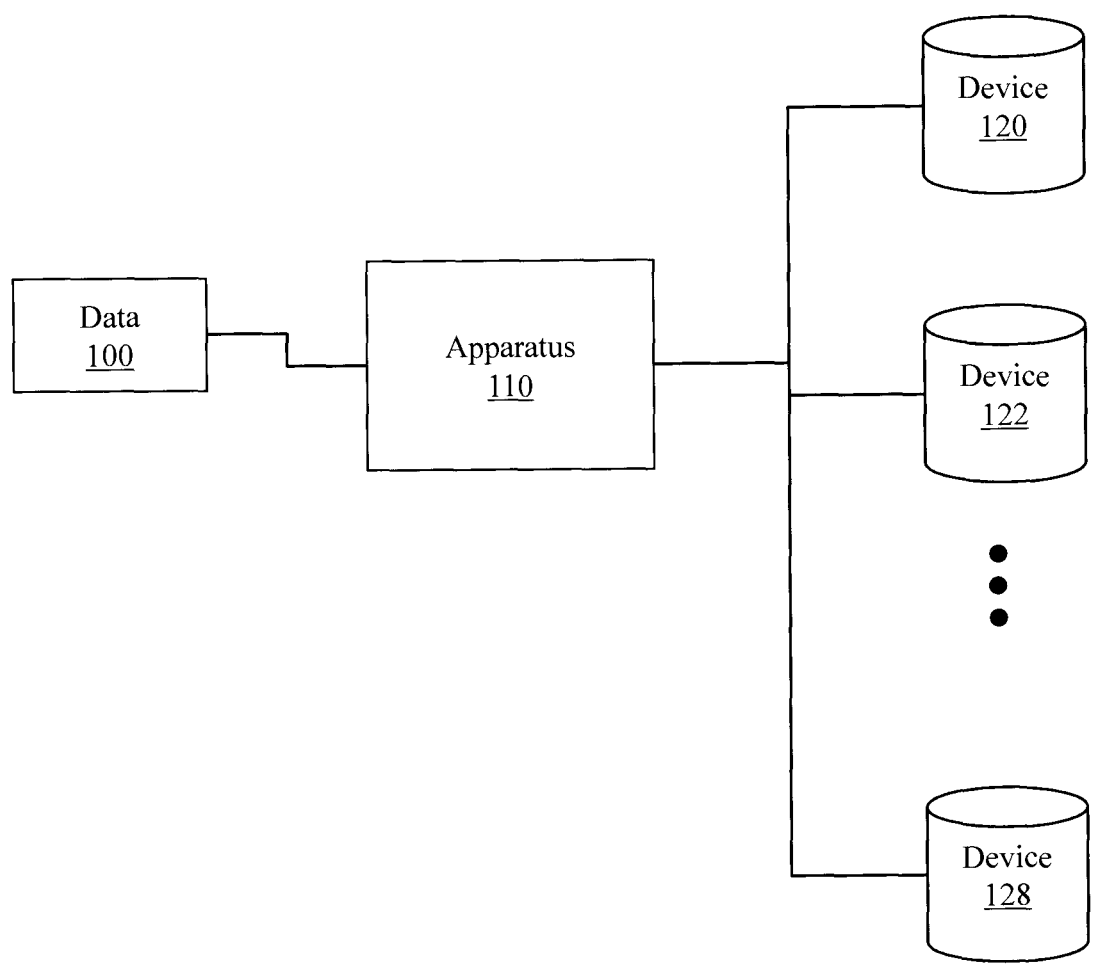
FIG. 1 illustrates data being received and processed by an example apparatus.

Viewing data in isolation, and handling input/output (i/o) operations from a data storage system as unrelated events produces inefficiencies for computers and data storage apparatus. Not all data is the same and different i/o operations may be related. Data may have different properties upon which decisions that improve the efficiency of a data storage apparatus (DSA) or data storage system (DSS) can be made. The properties may include, for example, sources from which data is accessed, destinations to which data is provided, sizes of pieces of data, types of pieces of data received, or other properties. Over time, information about the data stored by a DSA or DSS may be acquired. For example, information including a frequency with which data from a certain source is read, a frequency with which data of a certain type is read, a frequency with which data of a certain size is read, and other information may be gathered. Other information about the data may also be gathered. For example, certain sources of data may frequently provide data at or near the same time while other sources of data may rarely if ever provide data at or near the same time. Additionally, certain readers of data may frequently read data at or near the same time while other readers of data may rarely if ever read data at or near the same time. Over time, correlations, relationships, or access patterns may be identified that may facilitate improving the efficiency of data storage and recall by treating i/o operations as predictable events. For example, if a usage pattern is identified that facilitates predicting what data is likely to be read next, then proactive operations may be undertaken to leverage that prediction. By way of illustration, a disk that is not spinning may be brought up to speed to minimize a delay time for reading the data that is predicted to be read. Additionally, a sophisticated pre-fetch functionality may be provided and data may be relocated to enhance the performance of a data storage system.

A conventional system may detect that a file is being read and predictively read the rest of the file. While this is useful, it may be limited to a single file. A conventional system may also detect that a certain portion (e.g., sector, track, block) of a data storage device is being accessed and may predictively pre-fetch the entire portion just in case it may be needed based on no other criteria than proximity. Example apparatus and methods may go beyond this file read-ahead or spatial pre-fetch and may detect that when a certain read action occurs that other read actions that will acquire data outside the currently accessed file or space are likely to follow and may predictively pre-fetch the additional information.

Similarly, if a usage pattern is identified that facilitates predicting what data is likely to be received next, then proactive operations may be undertaken to leverage that prediction for more efficiently ingesting and storing the data that may be received. By way of illustration, a disk that is not spinning may be brought up to speed so that data intended for that disk may be delivered to that disk without waiting for a spin-up delay.

Like not all data is the same, not all DSA are the same. Different devices may have different write times, different read times, different overall capacities, different available capacities, different dollar costs, different energy costs, different security levels, and other different properties. The properties of a device may not be static and may vary based on a device state. For example, a disk that is already spun up to read or write data may consume less electricity for a given i/o operation than a disk that is not already spun up. Additionally, device performance may change over time. For example, as a disk becomes more full, its average read or write time may increase, or as bit errors accumulate the error rate for a device may increase. When information about data and a DSA is available, decisions can be made about where or how to acquire or store data. Additionally, when information about data, DSA, and access patterns is available, decisions can be made about where or how to acquire or store data.

Thus, example apparatus and methods improve over conventional systems by removing the necessity for a user to explicitly or even to implicitly direct inputs or outputs. Additionally, example apparatus and methods improve over conventional systems by addressing some remaining inefficiencies associated with the different ways in which different devices or different portions of devices operate. Selective adaptive predictive placement improves the efficiency of data storage systems. Information about the data can be acquired from the data as it is encountered, and information about tendencies or relationships can be acquired over time. The as-encountered information about data and the tendency/relationship information about data can then control data placement and data retrieval, including pre-fetching, migration, replication, erasure code production, deduplication, and other actions.

Different data may be treated differently. For example, data of a first type or from a first set of sources may need to have a certain redundancy level while data of a second type or from a second set of sources may need a different redundancy level. Thus, one attribute of data storage that may be controlled by as-encountered information about data and tendency/relationship information about data may be the redundancy or error correction code policy applied to the data.

Different devices may also be treated differently. For example, a first device may exhibit a first level of performance while a second device may exhibit a second level of performance. The amount of redundancy or error correction code policy applied to data may vary based on the performance level of the device to which the data is to be stored.

Data about devices may also guide a multi-stage storage decision. For example, as-encountered information about data and tendency/relationship information about data may indicate that ultimately a certain piece of data is going to be stored on a first device where related information is located. However, at the time that the data is encountered, that first device may not be spun up, may be over-subscribed, or may be in some other energy-inefficient state. Rather than consume an undesirable or unnecessary amount of energy or wait for the device to enter an energy efficient state, example apparatus may temporarily store the data in a temporary location and then transfer the data to the ultimate destination when the ultimate destination is in a more energy efficient state. For example, data may temporarily be buffered in a solid state drive (SSD) and then transferred to a disk at a later time when the disk is spun up or not so over-subscribed. Similarly, when a disk is spinning, if there is a prediction that a certain piece of data on that disk may be requested in the near future, then the data may be copied to a temporary location from which it may be efficiently retrieved later. This may avoid having to spin up the disk another time to acquire that piece of data. If the data ends up not being needed it may simply be discarded from the temporary location.

In one embodiment, a probabilistic model may be employed to make informed guesses about a piece of data. For example, a memoryless state machine like a Markov chain system may be employed to identify data or attributes of the data.

Figure 2:
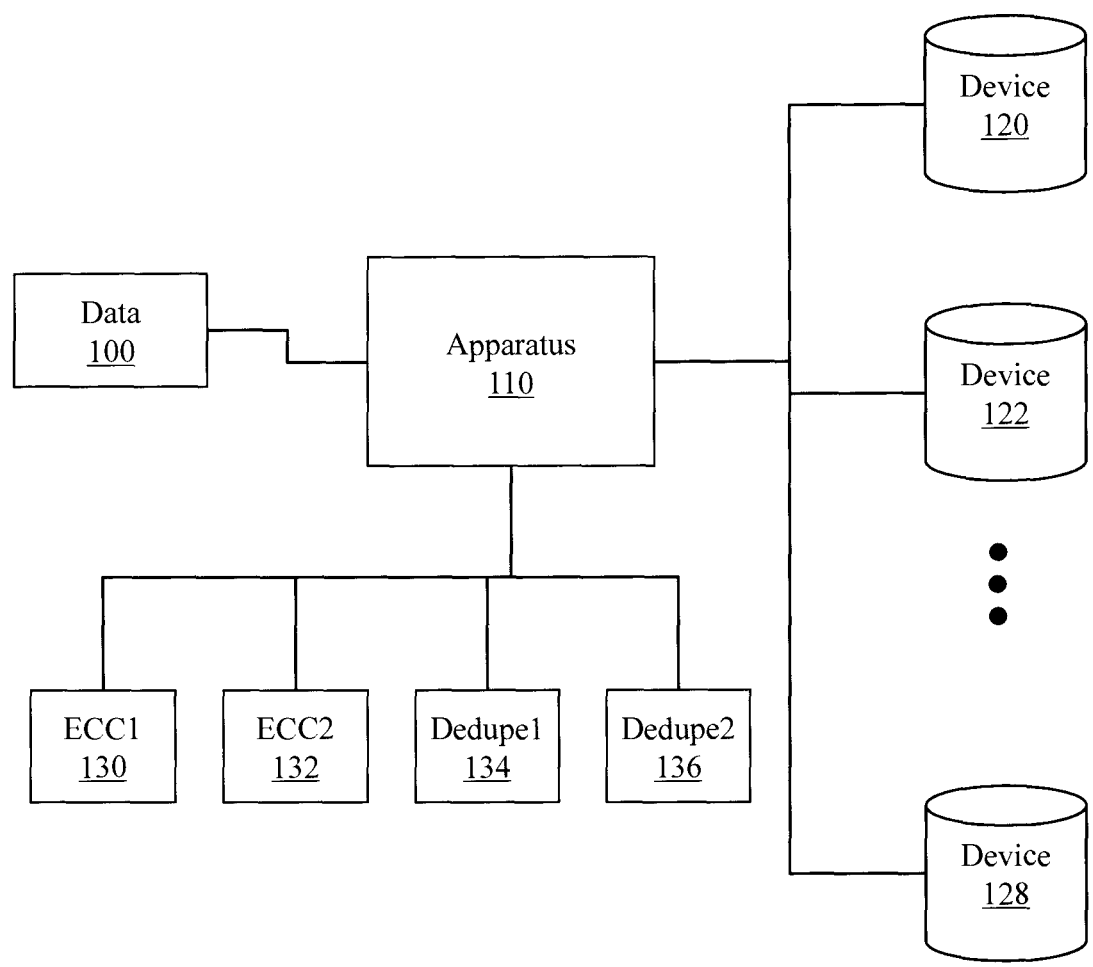
FIG. 2 illustrates data being received and processed by an example apparatus.
Figure 3:
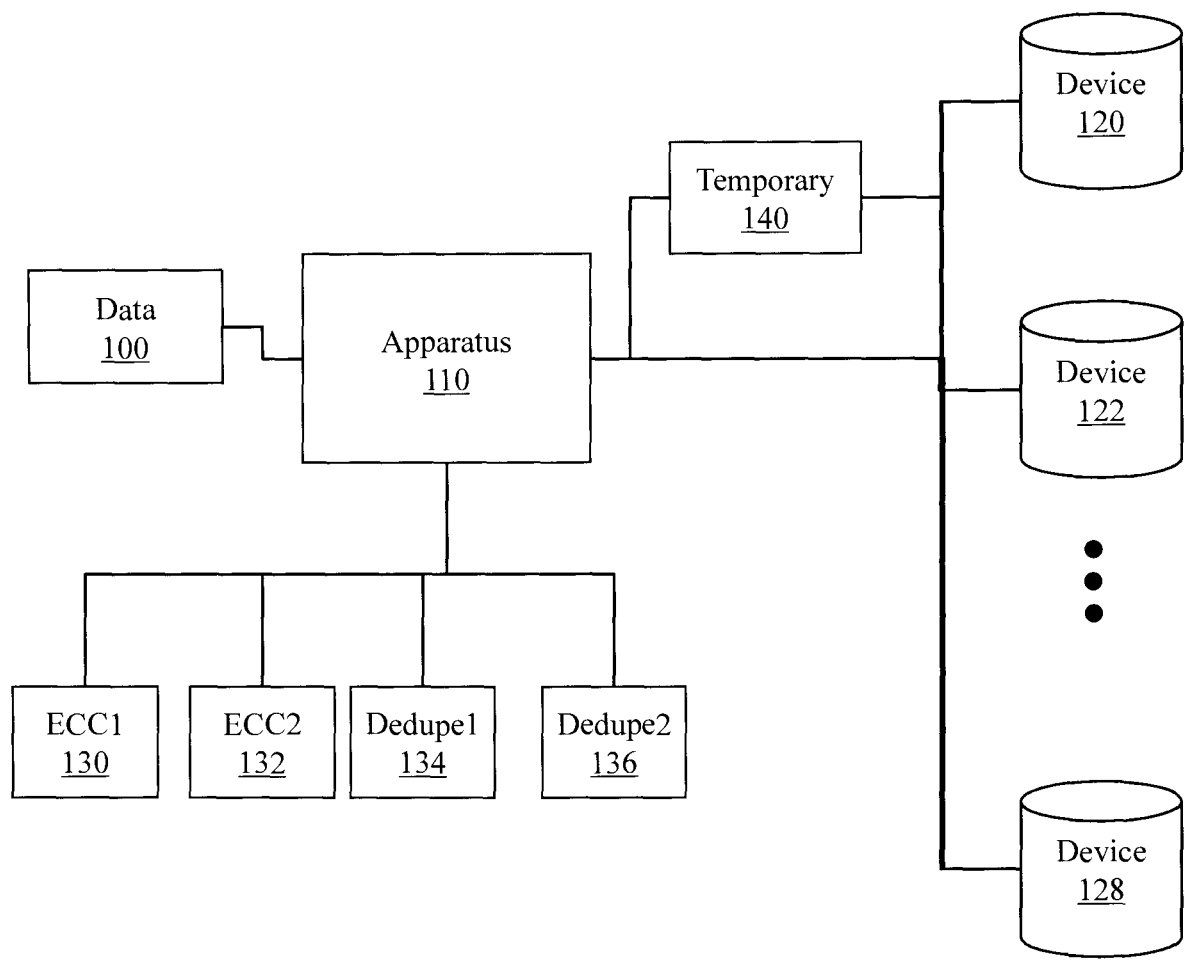
FIG. 3 illustrates data being received and processed by an example apparatus.
Figure 4:
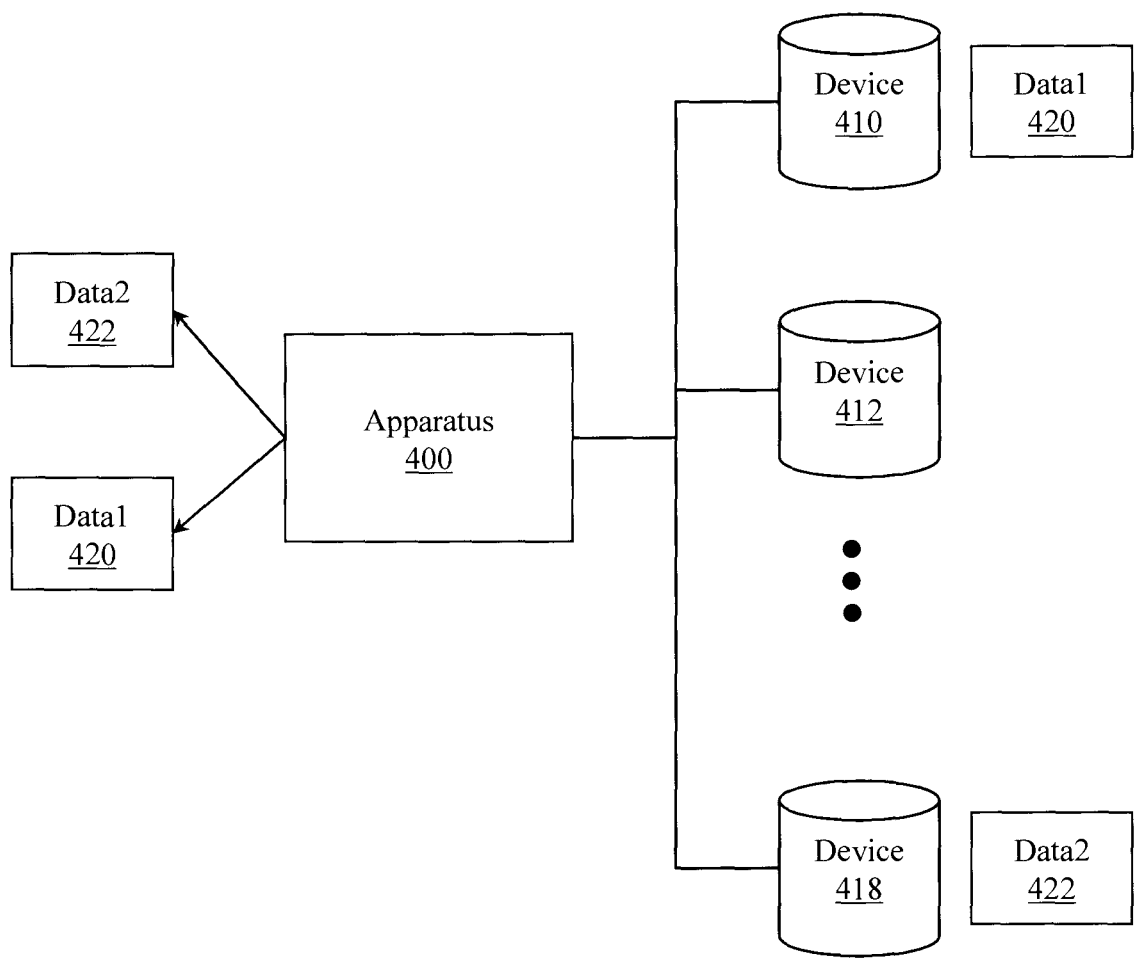
FIG. 4 illustrates data being pre-fetched by an example apparatus.
Figure 5:
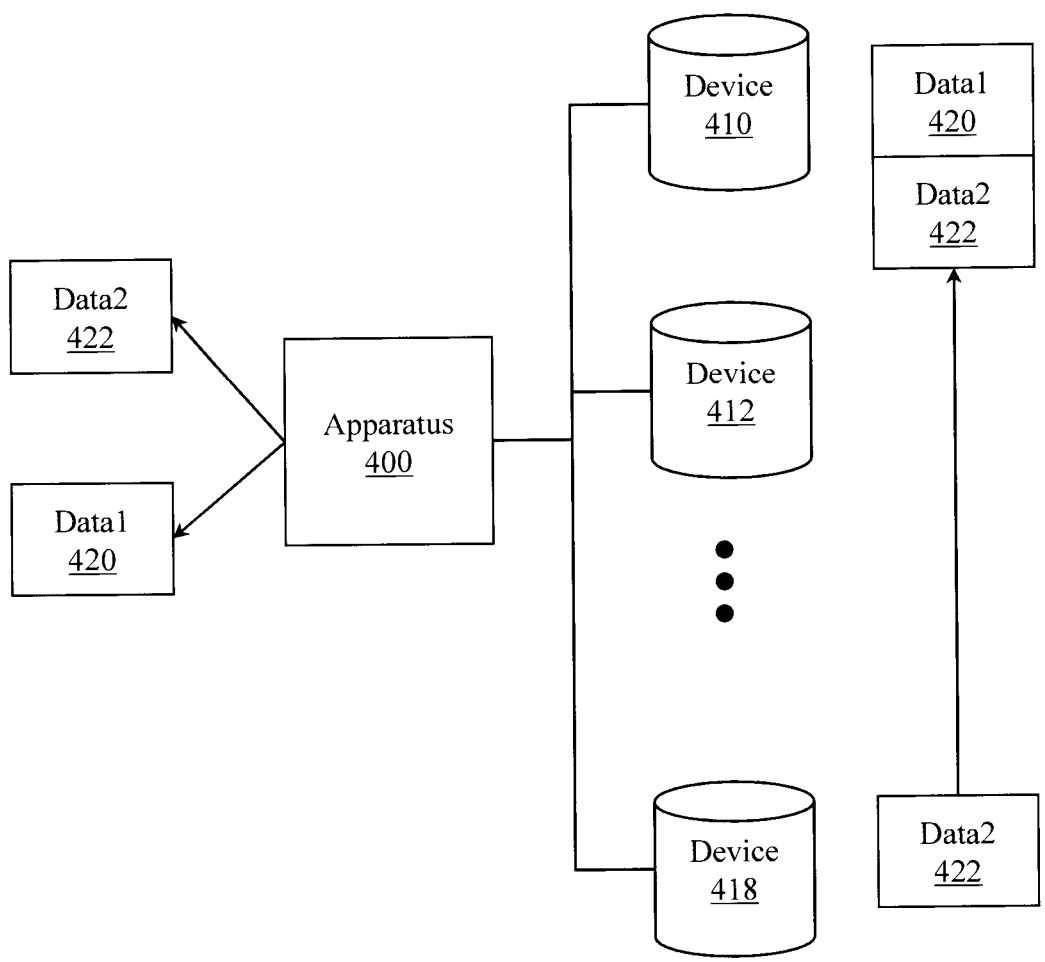
FIG. 5 illustrates data being migrated by an example apparatus.
Figure 6:
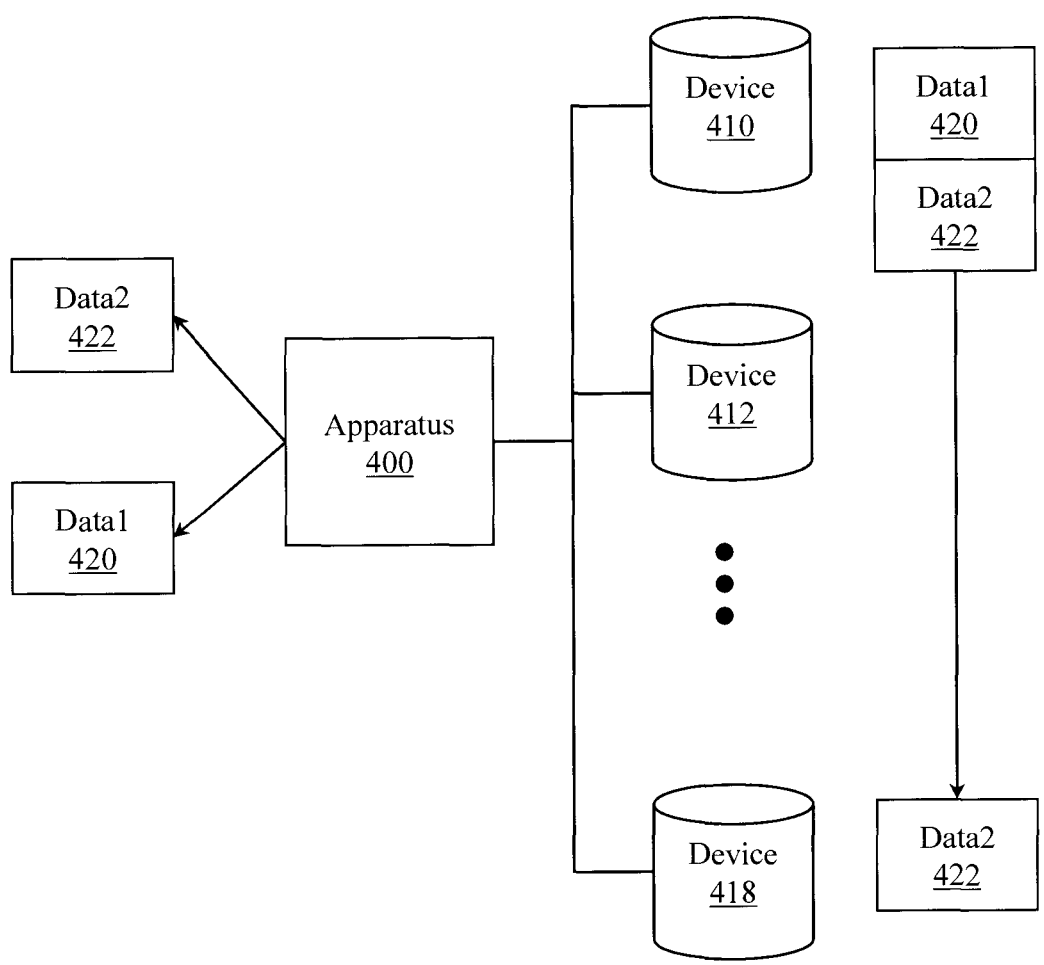
FIG. 6 illustrates data being migrated by an example apparatus.

FIGS. 1-6 illustrate data being processed by an example apparatus. The data may be processed in response to a read request to retrieve stored data or in response to an ingest action to store additional data. FIGS. 1-3 illustrate processing associated with receiving or ingesting new data. FIGS. 4-6 illustrate processing associated with retrieving and processing data that has already been stored. In the figures, data is being received at a computer or is being requested at a computer. The computer needs to find the data to satisfy the read request or needs to process the data to store it. When storing data, different choices may be made. The choices may include, among other things, discarding the data, ignoring the data, or performing a data storage operation for the data. Similarly, when retrieving data, different choices may need to be made. The choices may include, among other things, pre-fetching data, reading data as data, recreating data from erasure codes, rehydrating data from a deduplication recipe, or other action.

Performing a data storage operation may include deciding where to put data or deciding from where data should be read. Performing a data storage operation may also include determining whether or how to pre-process data before storing the data or determining how to recreate data as it is read. The pre-processing may include, for example, de-duplicating the data, producing error correction codes for the data, replicating the data, or other operations. The data recreation may include determining that data is correct, acquiring erasure codes or other error correction data as required, or other actions.

Conventional systems may input the entire data and then decide whether and how to store the data based on a static pre-defined rule that doesn't consider all of the available information about the data. Or, conventional systems may treat all data that is input the same. Example apparatus and methods may evaluate information about the data as the data is encountered to make predictions about how the data ought to be processed. The predictions can be made while the data is being received rather than waiting for the entire data to be received. Example apparatus and methods may also evaluate information about a data storage system to make predictions about how the data ought to be processed. Not all data may be treated the same. Conventional systems may also read some set of data (e.g., file, object, binary large object (BLOB)) in isolation according to a pre-established policy. Example apparatus and methods may evaluate information about the data being read to make predictions about how the data ought to be read and how the data ought to be stored.

A first level of prediction may concern the ultimate size of a piece of data, the type of data being received, a likely owner of the data, or other descriptive information. First level predictions may be made from metadata associated with data being processed. For example, information about a file size may be available for a file being read. In this case the prediction is based on descriptive metadata. A second level of prediction may concern more sophisticated issues including what type or volume of erasure codes are likely going to be needed to correct data being read, what type of deduplication is likely going to be applied to ingested data, what type of error correction code policy is going to be applied to ingested data, or an ultimate destination for the data. Second level predictions may be based on descriptive metadata and history. For example, a certain file or certain type of file being read from a certain device or certain type of device may have a history of requiring a certain number of corrections. Thus, a prediction of the number or type of erasure codes to be retrieved in parallel with the reading of the file may be made and the erasure codes may be pre-fetched just in case they are needed. If the erasure codes aren't needed then they may simply be discarded.

A third level of prediction may concern even more sophisticated issues including spatial, temporal, or other relationships between the data and other data that has been processed or that is likely to be processed by the system. The spatial, temporal, or other relationships may be used to control pre-fetching data, relocating data that has been stored, or other actions. For example, data that is read together with a certain frequency may be moved to a single device or may be relocated on a device so that it can be read more efficiently. Additionally, data that is rarely read together may be distributed to different devices or relocated on a device to make room for other data that may benefit from a different placement. Sophisticated pre-fetching may include reading files, objects, BLOBs, or other collections of data that tend to be read following a currently read item. Environmental factors may also be considered when observing data that is read. The environmental factors may include the performance (e.g., read time, error rate) for devices from which data is being read. Data may be relocated, replicated, protected by erasure codes, or otherwise manipulated based on the environmental factors that are observed while reading data.

In one embodiment, a probabilistic model (e.g., Markov chain) may be used to make the first, second, or even third level predictions. Since the predictions are just that, predictions, example methods and apparatus may rank the predictions and allocate computing resources based on the rank. For example, the top three predictions may be identified and then parallel processes may be spawned to perform processing associated with each of the three predictions. By way of illustration, information learned from prior observations may indicate that when a certain piece of data is read that other pieces of data may be read. Unlike a conventional system that may only read ahead in a file, example apparatus may read from other files, objects, BLOBs, or data sets based on observed relationships and tendencies. By way of further illustration, information learned from current reads may indicate that a certain device has become over-subscribed and is suffering performance-wise. In this case, data may be selected to be migrated to other devices based on the observed read patterns.

In one embodiment, if there are two different predictions about the error correction codes to be computed for incoming data, then parallel processes may produce the two different types of error correction codes. Once a final decision is made about some data, unneeded error correction codes may be discarded. Predicting what type of processing (e.g., error correction codes) will be needed facilitates producing the error correction codes while the data is still being received, which in turn reduces the time required after the data is fully received to protect the data. This may reduce the time during which the data is exposed to loss and thus improve the performance of a data storage device.

By way of further illustration, a prediction may be made about the ultimate destination for data and a suitable temporary destination for the data. While the data continues to be received, information about the ultimate destination and a suitable temporary destination(s) may be acquired. If the ultimate destination is a disk that is already spun up and/or not over-subscribed, then the data may be provided to that ultimate destination. If the ultimate destination is a disk that is not already spun up and/or over-subscribed, and there is another suitable temporary location that is already spun up, then the data may be provided to the temporary location. The data may then be migrated at a later time when both the temporary location and the ultimate destination are both powered up. Using devices that are already powered up, spinning, available and having appropriate available capacity may reduce the amount of energy used by a data storage system, thereby improving the energy efficiency of the data storage system.

By way of further illustration, a prediction may be made about other data that is likely to be seen together with this data. The prediction may be for data that is read when other data is read, for data that is ingested when other data is ingested, for data that is read when other data is ingested, or for data that is ingested when other data is read. The in process data and the predicted data may then be analyzed to preserve or enhance efficiencies available through spatial or temporal relationship based storage. For example, by storing data that typically arrives together in the same zone of a shingled magnetic recording (SMR) device, write efficiency may be improved. Similarly, by storing data that typically arrives together on the same column of a data storage array, energy may be saved by only having to spin up one device. When data that is read together is stored together, then only a single disk may need to be spun up. However, a balance must be struck concerning storing items together and over-subscribing a storage device.

Predictions may be good or may be poor. The result of a poor prediction may cause data to be stored together with other data for which there isn't really a sufficient relationship. Thus, over time, as predictions are evaluated, the results of actions taken based on the prediction may be amended. For example, data that was originally stored in a first location may be migrated to a second, more suitable location. Similarly, data for which a first type of deduplication or a first type of error correction code policy was applied may be reprocessed over time. Additionally, a balance may need to be struck concerning storing data together. Storing too much data on the same device or in the same location may cause that device or location to be over-subscribed, which may in turn lead to degraded performance due to contention. Thus, example apparatus and methods may identify data that ought to be stored on separate devices to facilitate using more hardware in parallel and to reduce contention issues.

Turning now to FIG. 1, data 100 is received at apparatus 110. Several different devices (e.g., device 120, device 122, . . . device 128) may be available to store the data. Apparatus 110 may determine values for properties of the data 100 and may also determine values for properties of the different devices. Apparatus 110 may make a prediction about the data 100 based, at least in part, on the properties of the data 100 and the properties of the devices. The prediction may concern, for example, what other data is likely to be processed together with data 100. The properties of the data 100 may include metadata (e.g., name, size, owner, permissions) about data 100. The apparatus 110 may then treat the data 100 differently based on the prediction. For example, the data 100 may be stored on device 120 instead of device 122 based on the prediction. While sending data to an appropriate location is useful, apparatus 100 may perform more sophisticated operations.

FIG. 2 illustrates apparatus 110 interacting with two different error correction code (ECC) generators (ECC1 130, ECC2 132) and two different data de-duplicators (dedupe1 134, dedupe2 136). Apparatus 110 may make a prediction about the data 100 and then select which, if any, of ECC1 130, ECC2 132, dedupe1 134, and dedupe2 136 to process data 100. The prediction may concern, for example, the error rate the data will experience when read back from a storage device. When a determination is made that FCC is going to be desired, but the determination of which exact ECC is going to be used is not possible, then apparatus 110 may cause both ECC1 130 and ECC2 132 to produce ECC for data 100. When the ultimate determination is made, unneeded ECC may simply be discarded. By computing both types of ECC on-the-fly as data 100 is received, the period of time during which data 100 is exposed to loss may be reduced. Additionally, the time required to store data 100 may be reduced since ECC can be computed in parallel and stored in parallel instead of being produced after the data 100 is completely received.

FIG. 3 illustrates a temporary storage location 140. Apparatus 110 may send data 100 to temporary storage location 140 based, at least in part, on a prediction about the data 100 and a state of an ultimate destination for data 100. For example, if the ultimate destination is likely to be device 120, and if device 120 is over-subscribed or in some other state that indicates that writing data 100 to device 120 at this time would be inefficient, then apparatus 110 may write data 100 to temporary location 140. The data 100 may be transferred from temporary location 140 to device 120 at a later time when the transfer may be made in an efficient manner.

FIG. 4 illustrates predictive pre-fetching that extends beyond a conventional file read-ahead or unit-level spatial pre-fetch. Apparatus 400 may process a request to provide data1 420. Data1 420 may have been located on any of devices 410, 412 . . . 418. Conventionally, when data1 420 was read, a read-ahead in a file or a storage-unit level spatial pre-fetch may have been performed. However, the read-ahead may have been limited to the item being read and the pre-fetch may have been limited to the unit of storage for the device from which data1 420 was read. Apparatus 400 may perform a different type of read-ahead where data2 422 is acquired from the same device or even a different device than data1 420. Data1 420 may be, for example, a movie file. Data2 422 may be, for example, a word processing file. Over time, apparatus 400 may have determined that when data1 420 is read that data2 422 is subsequently read. Thus, apparatus 400 may predictively pre-fetch data2 422 even though it is not in a file associated with data1 420, is not in the same unit of storage (e.g., block, sector, track, zone, page) as data1 420, or even though it is not on the same device as data1 420. While a single item data2 422 is illustrated, apparatus 400 may predictively pre-fetch a greater number of items. Having determined that there are patterns for reading certain items, apparatus 400 may take proactive actions to migrate data on the available devices to further enhance performance.

FIG. 5 illustrates migration to support pre-fetching from one device. Apparatus 400 has determined that data1 420 and data2 422 are being read together sufficiently frequently that a migration action is appropriate. In this embodiment, apparatus 400 migrates data2 422 from device 418 to device 410. This type of migration may increase energy efficiency because selectively pre-fetching data2 422 may be performed while device 410 is powered up and accessed to read data1 420. This type of migration may also increase computer performance because delays may be avoided. However, the efficiencies gained by locating data on a single device need to be balanced with opportunities for parallel i/o processing and potential performance degradation if a device becomes over-subscribed.

Thus, FIG. 6 illustrates migration to support maximizing the use of hardware in parallel and to minimize over-subscription issues. Apparatus 400 has determined that data1 420 and data2 422 are being read together sufficiently frequently that a migration action is appropriate. In this embodiment, apparatus 400 migrates data2 422 from device 410 to device 418. This type of migration may increase the opportunity to read items in parallel. This type of migration may also facilitate distributing read loads to reduce the rate at which wear and tear accumulates on a single device. In one embodiment, the migration direction (e.g., aggregating, distributing) may be controlled by a user-configurable policy. In another embodiment, the migration direction may be controlled, at least in part, by environmental factors. For example, the capacity of a device, the latency for a device, or the error rate for a device may cause apparatus 400 to move items to or from the device. In one embodiment, data may be replicated and distributed to different devices or media. Then, when the data needs to be provided at a particular rate to satisfy, for example, a quality of service requirement or streaming requirement, the extra copies of the data that were replicated and distributed may be accessed without further burdening an over-subscribed device.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 7:
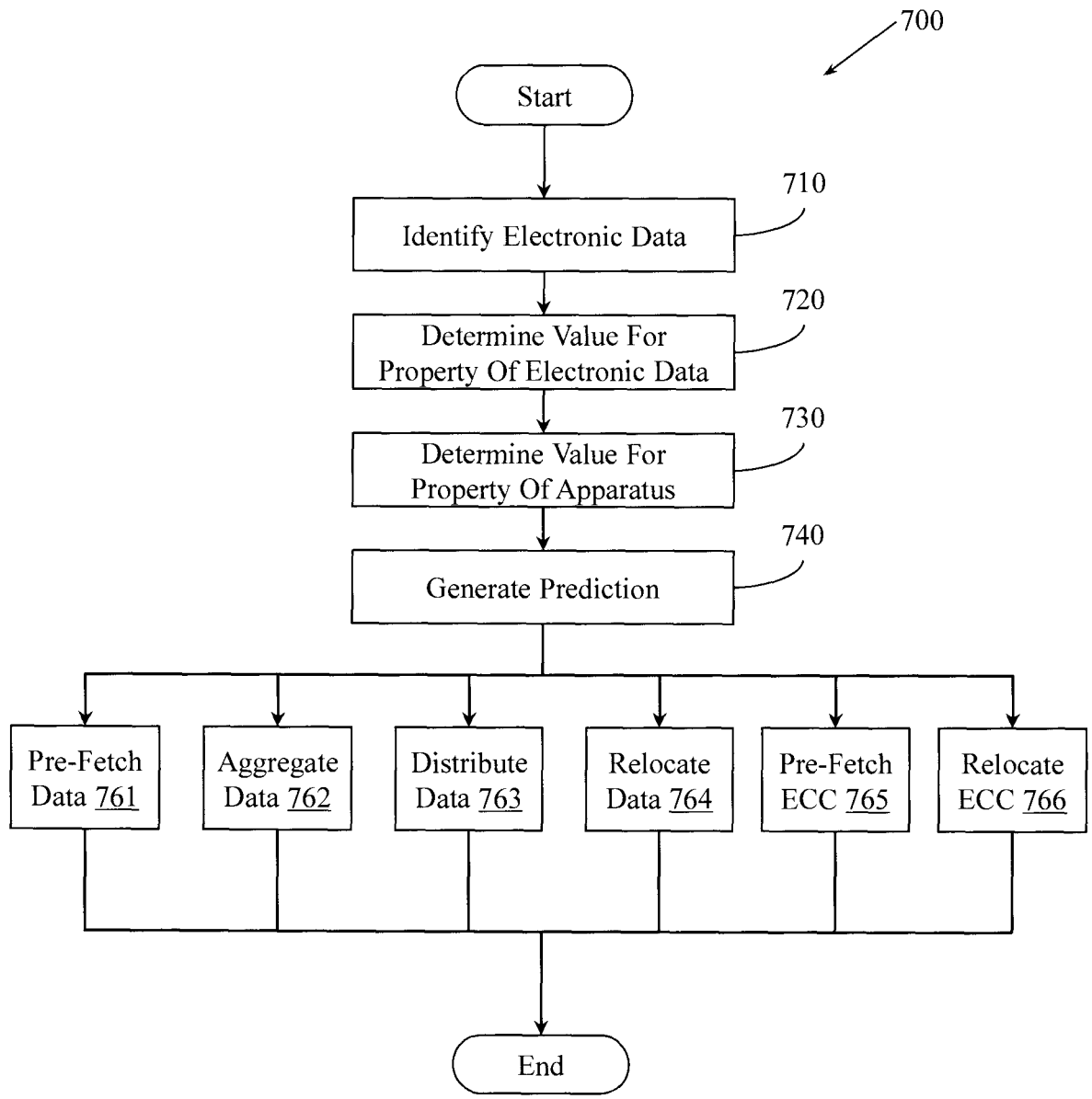
FIG. 7 illustrates an example method associated with selective adaptive predictive placement for a data storage apparatus (DSA).

FIG. 7 illustrates a method 700 associated with selective adaptive predictive data placement performed by a computer for a data storage apparatus. Method 700 cannot be performed in the human mind or by pencil and paper because the problem solved only exists in an operating data storage system. Method 700 includes, at 710, identifying electronic data to be processed for a data storage apparatus accessible to the computer. The electronic data may be being read from the data storage apparatus or may be being ingested from a data source. Different predictive data placements may be made based on whether the data is being read or ingested. This embodiment concerns pre-fetching and relocation of data that has already been stored.

Method 700 also includes, at 720, determining a value for a property of the electronic data. The property of the electronic data may reside in descriptive metadata. The descriptive metadata may include, for example, a data size, a data type, a data owner, a data source, a data destination, a data name, or a data organization (e.g., file, record, object, BLOB). When data is being read from a data storage apparatus, then the descriptive metadata may be known. When data is being ingested, then predictions about the descriptive metadata may be generated and employed. During ingest, speculative parallel processing may be performed based on predictions about the descriptive metadata until a final determination of the first property is known.

The property of the electronic data may also include information other than simple descriptive metadata. For example, the property may include an identifier of a byte-stream pattern associated with the data. The byte-stream pattern may be used to predict other information about data being ingested. For example, certain byte-stream patterns may identify movie data that is associated with large files that are not deduplicated while other byte-stream patterns may identify text data that is associated with single files for which extensive erasure code protection is desired.

In one embodiment, additional properties of the electronic data may be evaluated. Additional properties of the electronic data may be something other than descriptive metadata. For example, the additional properties may include a history of encountering data from a source, a history of encountering data of the size of the electronic data, a history of encountering data of the type of the electronic data, or a history of encountering data from the owner of the electronic data. The history may be described in different ways. For example, the history may include a count of the number of times an action occurred, a frequency with which an action occurs, how recently an action has occurred, whether the action is increasing or decreasing, or other information. The history data may be used to discover relationships, patterns, or tendencies for data.

Further properties of the electronic data may include relationship data. For example, the properties may include a spatial relationship between the electronic data and other electronic data. The spatial relationship may describe how close to or far away from the other electronic data is located with respect to the electronic data. The third properties may also include a temporal relationship between the electronic data and other electronic data. The temporal relationship may describe how close in time the electronic data and the other electronic data are processed. The prediction generated at 740 may, therefore, be based on spatial data, temporal data, or a combination thereof. For example, data that is accessed within a threshold amount of time and that is located within a threshold distance may be pre-fetched while data that is accessed within the threshold amount of time but is located outside the threshold distance may not be pre-fetched. A determination that data is being accessed within the threshold amount of time but is still not being pre-fetched due to spatial concerns may trigger the aggregation, distribution, or relocation of data.

Some processing systems may perform better when they have some understanding of the amount of data being processed for a given operation. For example, processing can be adapted to handle extremely large files or very small files. Thus, in one embodiment, the first properties of the electronic data may include an identifier of whether the data fits in an input buffer associated with the computer. When data is being read from a data storage apparatus, a value for this property may be known precisely. When data is being ingested, a value for this property may be predicted.

Method 700 also includes, at 730, determining a value for a property of the data storage apparatus. The property of the data storage system may include descriptive data like a total capacity, an unused capacity, a dollar cost for a data storage operation, an electrical cost for a data storage operation, a read time, a write time, a security level, a subscription level, or a state of the data storage apparatus. Different states may include a spinning state, a not spinning state, a powered up state, a not powered up state, a busy state, a not busy state, an on state, an off state, or other states. The property of the apparatus from which data is being read or to which data may be targeted may be analyzed in light of the properties of the electronic data being processed to control data placement.

Method 700 also includes, at 740, generating a prediction about the electronic data using a probabilistic model that considers values for the properties of the electronic data, values for the properties of the data storage apparatus, and previously observed behavior associated with the electronic data with respect to the data storage apparatus. In one embodiment the probabilistic model may be a Markov Chain based model. Other models may be employed. The previously observed behavior may describe, for example, how frequently data is read, how frequently data is read immediately before or after some other data, how frequently data is read within a threshold period of time of some other data, or other information.

The prediction may identify data that is likely to be read based on different criteria. For example, the prediction may be based on electronic data that is being read from the data storage apparatus or on electronic data that is data that is being ingested by the computer. The prediction may also identify data that is likely to be ingested based on different criteria. For example, the prediction may be based on electronic data that is being read from the data storage apparatus or on electronic data that is being ingested by the computer.

Method 700 also includes controlling the computer to selectively perform an adaptive predictive data placement for the electronic data or the data storage apparatus based, at least in part, on the prediction. The adaptive predictive data placement may be, for example, pre-fetching additional electronic data at 761. In one embodiment, the additional electronic data may be pre-fetched from the data storage apparatus while in another embodiment the additional electronic data may be pre-fetched from a device other than the data storage apparatus. Unlike conventional systems that simply pre-fetch the remainder of an item being read, or that speculatively pre-fetch data co-located with data being read, method 700 performs a more sophisticated analysis. Data may be selected for pre-fetching based on observed behavior that relates different files, different objects, different BLOBs, or other collections of data.

The adaptive predictive data placement may be, for example, aggregating the electronic data or additional electronic data onto a smaller number of devices at 762. Aggregating data onto a smaller number of devices may allow related data to be more efficiently pre-fetched in terms of time or electrical consumption. For example, if the related data is aggregated onto a single drive then only that drive may need to be spun up to pre-fetch data. However, aggregating data onto a single device may cause that device to become overfull or may reduce opportunities for parallel processing. Thus, the adaptive predictive data placement may be, for example, distributing the electronic data or additional electronic data at 763, or relocating the electronic data or additional electronic data at 764. The additional electronic data may be, for example, replicas that are produced to mitigate the impact of an over-subscribed device. Distributing the data at 763 may cause data that is related to be placed on different devices, which may be more costly in terms of electricity, but which may also improve response time when parallel input is performed. Sometimes there may be tradeoffs between energy efficiency and response time. Thus, in one embodiment, a user configurable policy may control whether, when, or how data will be aggregated, distributed, replicated, or relocated.

Sometimes data is not the only thing stored by a data storage apparatus or a data storage system that has a plurality of data storage apparatus. For example, erasure codes or error correction codes that protect data may also be stored. From one point of view the erasure codes or error correction codes are data, but from another point of view they are derivative data. Thus, in one embodiment, the adaptive predictive data placement may be selectively pre-fetching an erasure code or error correction data for the electronic data at 765. The pre-fetching at 765 may be done based on historical data about the error rate for a set of data or for a data storage apparatus from which the data is being read. For example, when one piece or type of data is read from a certain apparatus there may be a first historical error rate that does not indicate that erasure codes or error correction data should be speculatively pre-fetched. However, when another piece or type of data is read from another apparatus there may be a second historical error rate that does indicate that erasure codes or correction data should be speculatively pre-fetched. In this example, the previously observed behavior may be an error rate, the prediction may concern the anticipated error rate, and the action may be pre-fetching erasure codes or error correction data. Since the erasure code or error correction data may be on different devices than the data they protect, the erasure code or error correction data may be pre-fetched from the data storage apparatus or from a device other than the data storage apparatus. Like moving data to be closer together or farther apart or even on different apparatus may increase electrical efficiency or response time, so too may electrical or operating efficiency be improved by relocating erasure codes or error correction data. Thus, in one embodiment, the adaptive predictive data placement may be relocating an erasure code or error correction data for the electronic data at 766. Once again, the erasure code or error correction data may be aggregated or distributed to achieve different goals.

Method 700 may also include relocating electronic data in the data storage apparatus as a function of an environmental factor associated with the data storage apparatus. For example, the environmental factor may be an error rate associated with the data storage apparatus. When the error rate exceeds a threshold level, then data may be relocated to improve efficiency and reduce errors.

Figure 8:
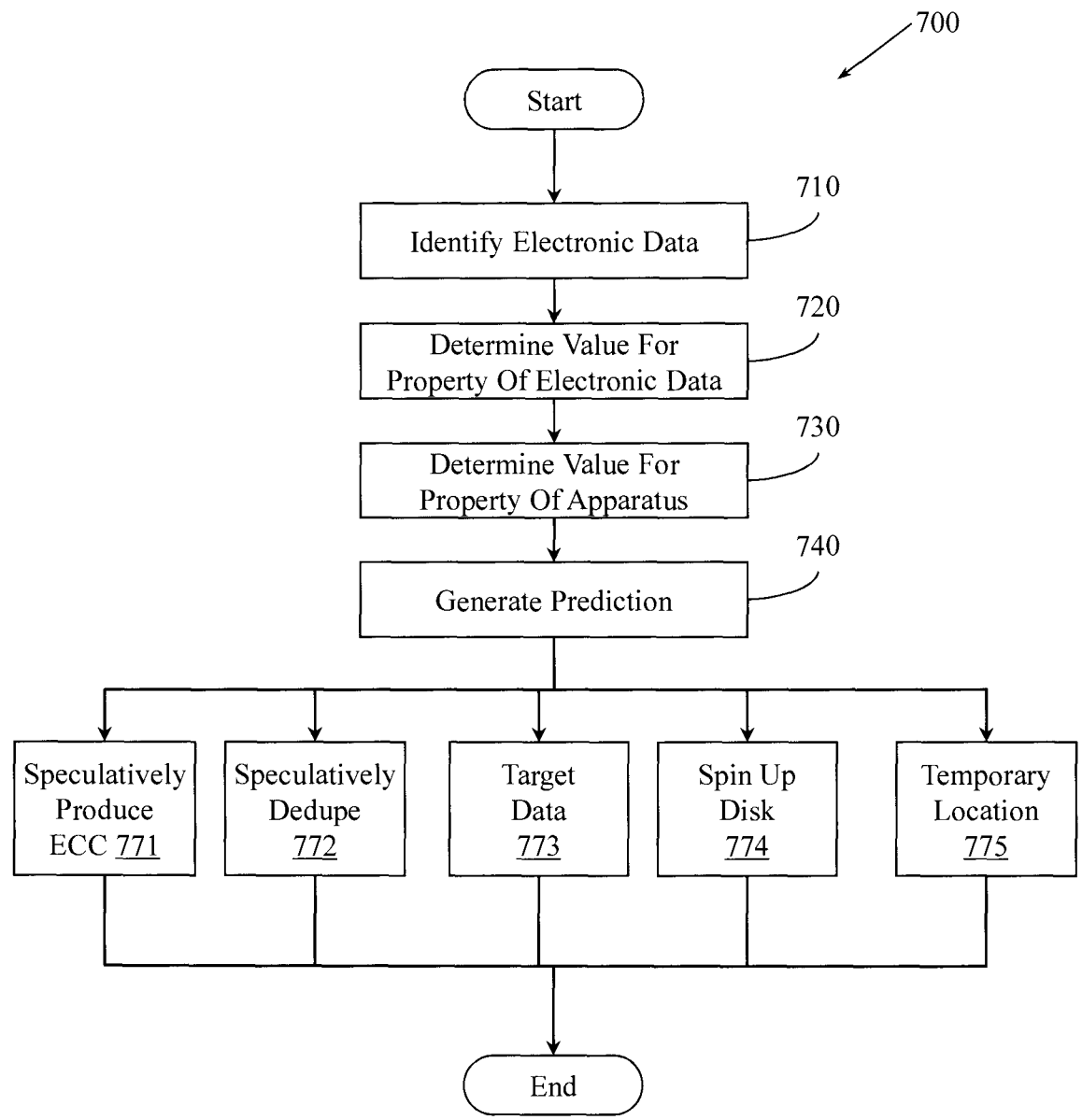
FIG. 8 illustrates an example method associated with selective adaptive predictive placement for a DSA.

FIG. 8 illustrates another embodiment of method 700. This embodiment illustrates selective adaptive predictive data placement actions associated with ingesting additional data. Since additional data that is being ingested may be related to already stored data, and since the already stored data may have been aggregated, distributed, or relocated based on previously observed behavior, newly ingested data may be placed based on rationale similar to that used to produce the aggregation, distribution, or relocation.

When data is being ingested there may be extra processing cycles available. Thus, in one embodiment, the adaptive predictive data placement may be speculatively producing an erasure code or error correction data for the electronic data at 771. Erasure codes or error correction data that ultimately aren't needed may be discarded. The adaptive predictive data placement may also be, at 772, speculatively deduplicating the electronic data. Rather than ingesting all the data and deciding to perform post-processing deduplication, inline deduplication may be performed and selectively retained or discarded.

In one embodiment, the adaptive predictive data placement includes targeting the electronic data for a selected data storage apparatus. The targeting may be based on relationships that were discovered from observing previous input/output behavior. For example, it may have been observed that a certain type of data is frequently ingested after a certain other type of data is read, or that a certain type of data is read after a certain type of data is ingested. Consider a system that supports data analytics. After receiving and storing a certain volume of transactional data, a report on that data may be read. Thus, method 700 may pre-fetch data associated with the report after detecting that a certain volume of the transaction data has been ingested. Consider a system that just experienced a large number of data errors during a read and that subsequently had to ingest a large number of erasure codes or error correction data. In this case, the data being ingested may be targeted based on the observed behavior of the error rate and the relationship to the data that produced that error rate.

Increasing the electrical efficiency of a data storage apparatus or increasing the operational efficiency of a data storage apparatus may involve intelligently preparing data storage devices for input or output. Thus, method 700 may include, at 774, selectively spinning up a disk drive. Increasing the electrical efficiency or operational efficiency may also include intelligently buffering data to prevent bottlenecks when doing input/output for a device that is busy. Thus, method 700 may also include, at 775, storing the electronic data to a temporary location and then moving the electronic data from the temporary location to an ultimate destination. Unlike conventional systems that spin up disks as needed, method 700 may spin up a disk based on a prediction about a future input/output operation, where the prediction is based on properties of data that is currently being processed and predictions about data that is likely to be processed in the near future. Similarly, unlike conventional systems that buffer data only after detecting a bottleneck, method 700 may anticipate a bottleneck based on currently observed behavior and previously observed behavior. When the bottleneck is predicted, method 700 may proactively buffer data before the bottleneck occurs.

In one example, a method may be implemented as computer executable instructions. Thus, in one example, a computer-readable medium may store computer executable instructions that if executed by a machine (e.g., processor) cause the machine to perform method 700. While executable instructions associated with method 700 are described as being stored on a computer-readable medium, it is to be appreciated that executable instructions associated with other example methods described herein may also be stored on a computer-readable medium.

Figure 9:
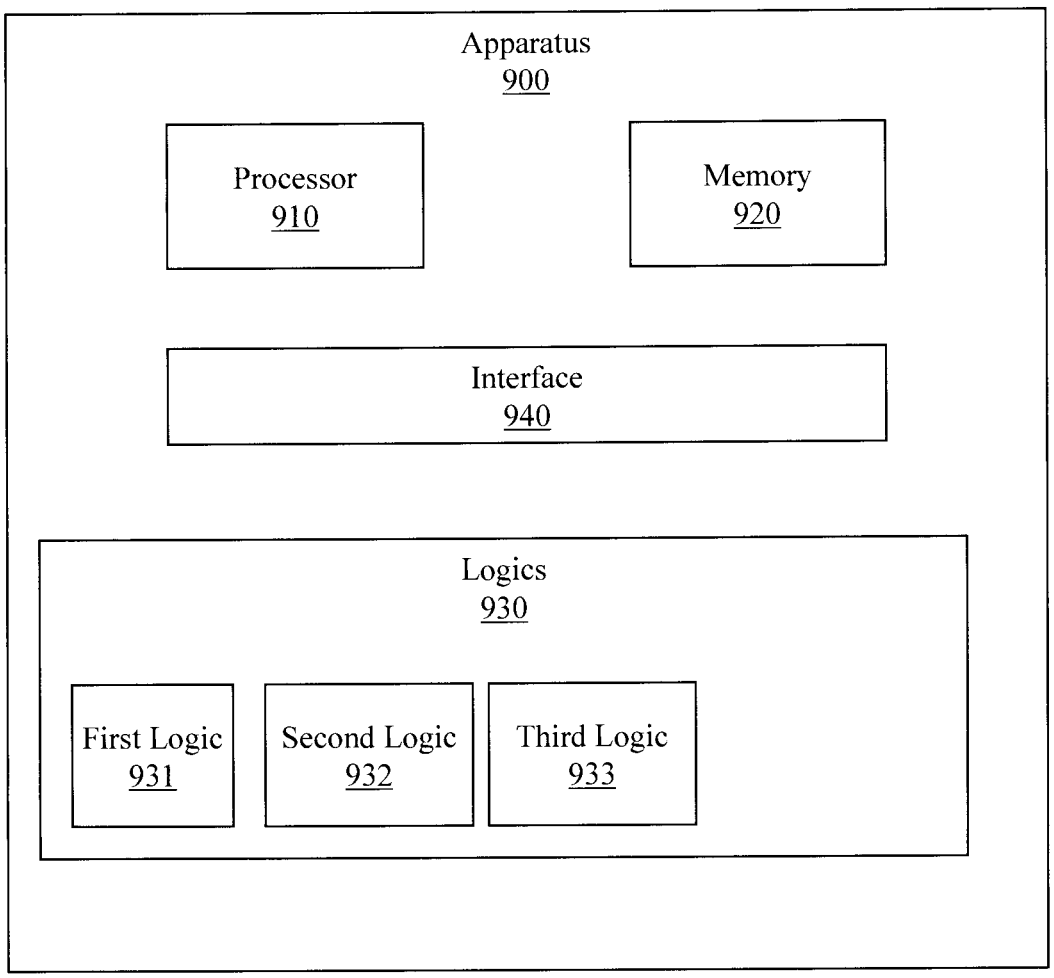
FIG. 9 illustrates an example apparatus that performs selective adaptive predictive placement for a DSA.

FIG. 9 illustrates an apparatus 900 that performs selective adaptive predictive data placement. Apparatus 900 includes a processor 910, a memory 920, and a set 930 of logics that is connected to the processor 910 and memory 920 by an interface 940. Memory 920 may store metadata about data being processed by the apparatus 900 for a data storage device in a data storage system. Memory 920 may also store information about an access pattern, a trend, a relationship, or a prediction concerning the data being processed by the apparatus 900 for the data storage device.

In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 930 are implemented as ASICs or SOCs. In one embodiment, the first logic 931, the second logic 932, or the third logic 933 may be ASICs, FPGA, or other integrated circuits.

The set 930 of logics includes a first logic 931 that processes a current read request associated with the data being processed for the data storage device. Information acquired while processing the current read request may be used to update observed input/output behavior for the data being processed and for the data storage device. For example, information concerning data that was recently processed by the first logic 931 may be stored to facilitate identifying patterns, relationships, or trends with respect to the data currently being processed. Additionally, information concerning an error rate for a data read may be acquired. The error rate data may be used to cause the generation of, pre-fetching of, or relocation of erasure codes or error correcting data associated with the data currently being processed. Additional information including, for example, read time, data size, data source, data owner, or other information may be acquired. In one embodiment, the first logic 931 updates the observed input/output behavior with respect to the temporal or spatial proximity of the data being processed and data recently processed for the data storage system. For example, a record may be made that stores information about the frequency or time interval between processing the current data and previously processed data. Data for which positive correlations exist may lead to one type of pre-fetching or relocating while data for which negative correlations exist may lead to different types of pre-fetching or relocating.

The apparatus 900 also includes a second logic 932 that makes a prediction about a future input/output request. The prediction may be based, at least in part, on the current read request and the observed input/output behavior. For example, the observed input/output behavior may identify data that is likely to be read after data associated with the current read request and may also identify data that is unlikely to be read after data associated with the current read request.

In one embodiment, the second logic 932 makes the prediction based, at least in part, on the temporal or spatial proximity of the data being processed and additional electronic data in the data storage system. For example, data that has been read more than a threshold number of times within a threshold period of time following reading of the current data may be predicted to be read again within a relevant time frame. Similarly, data that is stored nearby that has been read a threshold number of times within a threshold period of time may be predicted to be read again within a relevant time frame. This prediction goes beyond conventional systems that may read-ahead in a file.

The apparatus 900 also includes a third logic 933 that pre-fetches data from the data storage system or relocates data in the data storage system based, at least in part, on the prediction. The data is pre-fetched from the data storage system or relocated within the data storage system. In one embodiment, the third logic 933 relocates the electronic data and the additional electronic data to the same data storage device in the data storage system. Relocating related data to the same data storage device may save energy by reducing the number of times a disk has to be spun up. However, relocating related data to the same storage device may cause the device to become over-subscribed and the potential source of a bottleneck. Therefore, in one embodiment, the third logic 933 relocates the electronic data and the additional electronic data to different data storage devices in the data storage system. Moving data to different devices may facilitate taking advantage of parallel input/output channels and thereby improve response time. In one embodiment, data from an over-subscribed device may be replicated and copies may be distributed to devices having a more favorable subscription status.

Figure 10:
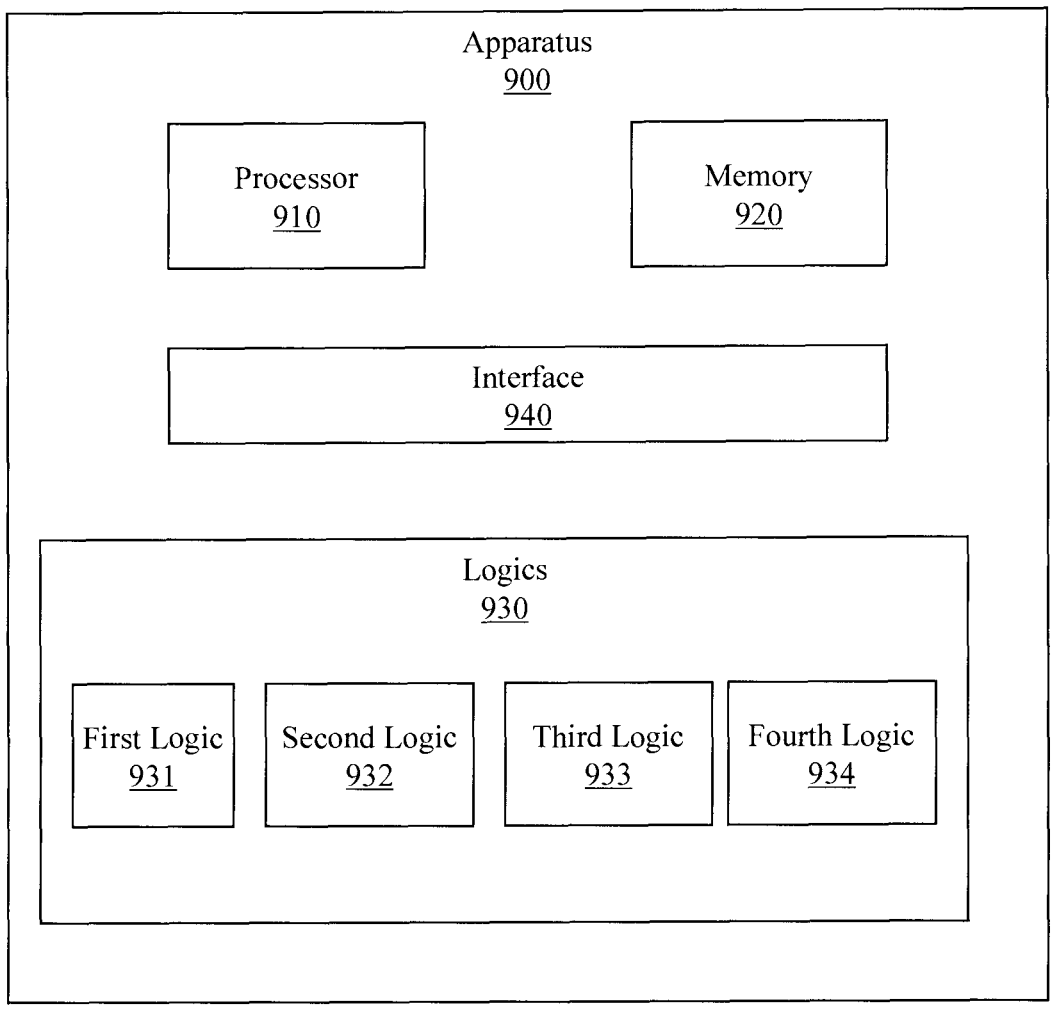
FIG. 10 illustrates an example apparatus that performs selective adaptive predictive placement for a DSA.

FIG. 10 illustrates another embodiment of apparatus 900. This embodiment includes a fourth logic 934 that handles data ingest. The fourth logic 934 ingests newly arrived electronic data and targets the newly arrived electronic data to a location in the data storage system. The targeting may be based, at least in part, on an attribute of the newly arrived electronic data or on a relationship between the newly arrived electronic data and previously processed electronic data in the data storage system. For example, data that is habitually ingested immediately following the reading of certain data may be stored on the same device that the data was read from to reduce spin up issues or may be stored on a different device to reduce bottleneck or contention issues.

In one embodiment, when sufficient cycles are available in processor 910, the fourth logic 934 may perform speculative operations. The speculative operations may include, for example, speculative erasure code production, speculative error correction code production, or speculative data deduplication. Whether the speculative actions occur may be based, at least in part, on an attribute (e.g., data type, data size, byte pattern) of the newly arrived electronic data or on a relationship (e.g., temporal, spatial) between the newly arrived electronic data and previously processed electronic data in the data storage system.

More generally, the methods and apparatus described herein may be part of a system that includes a computer and a data store efficiency apparatus. The computer runs a predictive data placement process for a data storage device. The process predicts a future input/output operation based on as-encountered data and historical data associated with a current input/output operation associated with the data storage device. The data store efficiency apparatus selectively relocates data on the data storage device based, at least in part, on the future input/output operation. In one embodiment, the methods and functionality of the apparatus described herein may be embodied in an application specific integrated circuit (ASIC) that controls data movement for a data storage device other than input/output based data movement. The ASIC includes gates configured to selectively relocate data on the data storage device based, at least in part, on a relationship between a current input/output operation and a predicted future input/output operation.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable storage medium storing computer-executable instructions that when executed by a computer cause the computer to perform a method, the method comprising:
   identifying electronic data to be processed for a data storage apparatus accessible to the computer;
   determining a value for one or first more properties of the electronic data;
   determining a value for one or more first properties of the data storage apparatus, where at least one of the one or more first properties of the data storage apparatus vary based on a state of the data storage apparatus;
   generating a prediction about the electronic data using a probabilistic model that considers the value for the one or more first properties of the electronic data, the value for the one or more first properties of the data storage apparatus, and previously observed behavior for the electronic data with respect to the data storage apparatus; and
   controlling the computer to selectively perform an adaptive predictive data placement for the electronic data or the data storage apparatus based, at least in part, on the prediction.

2. The non-transitory computer-readable storage medium of claim 1, where the adaptive predictive data placement includes pre-fetching additional electronic data.

3. The non-transitory computer-readable storage medium of claim 1, where the adaptive predictive data placement includes pre-fetching additional electronic data from a device other than the data storage apparatus.

4. The non-transitory computer-readable storage medium of claim 1, where the adaptive predictive data placement includes aggregating the electronic data or additional electronic data, replicating a portion of the electronic data or additional electronic data, distributing the electronic data or additional electronic data, or relocating the electronic data or additional electronic data.

5. The non-transitory computer-readable storage medium of claim 1, where the adaptive predictive data placement includes selectively pre-fetching an erasure code or error correction data for the electronic data.

6. The non-transitory computer-readable storage medium of claim 1, where the adaptive predictive data placement includes selectively pre-fetching an erasure code or error correction data for the electronic data from a device other than the data storage apparatus.

7. The non-transitory computer-readable storage medium of claim 1, where the adaptive predictive data placement includes relocating an erasure code or error correction data for the electronic data.

8. The non-transitory computer-readable storage medium of claim 1, the method comprising:
   generating a plurality of predictions about the electronic data, and
   controlling the computer to selectively perform two or more adaptive predictive data placements in parallel based, at least in part, on the plurality of predictions.

9. The non-transitory computer-readable storage medium of claim 1, where the prediction concerns the likelihood of a delay being produced during a current or anticipated input/output operation and where the adaptive predictive data placement relocates data or reorders the order in which data will be read to prevent the delay.

10. The non-transitory computer-readable storage medium of claim 1, where the adaptive predictive data placement includes speculatively producing an erasure code or error correction data for the electronic data, or speculatively deduplicating the electronic data.

11. The non-transitory computer-readable storage medium of claim 1, where the adaptive predictive data placement includes targeting the electronic data for a selected data storage apparatus.

12. The non-transitory computer-readable storage medium of claim 1, where the prediction identifies additional electronic data to be read and where the electronic data is data that is being read from the data storage apparatus.

13. The non-transitory computer-readable storage medium of claim 1, where the prediction identifies additional electronic data to be read and where the electronic data is data that is being ingested by the computer.

14. The non-transitory computer-readable storage medium of claim 1, where the prediction identifies additional electronic data to be ingested by the computer and where the electronic data is data that is being ingested by the computer.

15. The non-transitory computer-readable storage medium of claim 1, where the prediction identifies additional electronic data to be ingested by the computer and where the electronic data is data that is being read from the data storage apparatus.

16. The non-transitory computer-readable storage medium of claim 1, where the adaptive predictive data placement includes spinning up a disk drive.

17. The non-transitory computer-readable storage medium of claim 1, where the one or more first properties of the electronic data include a data size, a data type, a data owner, a data source, a data destination, a data name, or a data organization.

18. The non-transitory computer-readable storage medium of claim 1, where the one or more first properties of the electronic data include a byte-stream pattern associated with the data.

19. The non-transitory computer-readable storage medium of claim 1, where the one or more first properties of the electronic data include an identifier of whether the data fits in an input buffer associated with the computer.

20. The non-transitory computer-readable storage medium of claim 1, where the probabilistic model is a Markov Chain model.

21. The non-transitory computer-readable storage medium of claim 1, where second properties of the electronic data include a history of encountering data from a source, a history of encountering data of the size of the electronic data, a history of encountering data of the type of the electronic data, or a history of encountering data from the owner of the electronic data.

22. The non-transitory computer-readable storage medium of claim 1, where third properties of the electronic data include a spatial relationship between the electronic data and other electronic data, or a temporal relationship between the electronic data and other electronic data.

23. The non-transitory computer-readable storage medium of claim 1, where the adaptive predictive data placement includes storing the electronic data to a temporary location and then moving the electronic data from the temporary location to an ultimate destination.

24. The non-transitory computer-readable storage medium of claim 1, where the one or more first properties of the data storage system include a total capacity, an unused capacity, a subscription level, a dollar cost for a data storage operation, an electrical cost for a data storage operation, a read time, a write time, a security level, and a state of the data storage apparatus.

25. The non-transitory computer-readable storage medium of claim 24, where the state includes a spinning state, a not spinning state, a powered up state, a not powered up state, a busy state, a not busy state, an on state, or an off state.

26. The non-transitory computer-readable storage medium of claim 1, the method comprising relocating electronic data in the data storage apparatus as a function of an environmental factor associated with the data storage apparatus.

27. The non-transitory computer-readable storage medium of claim 26, the environmental factor being an error rate associated with the data storage apparatus.

28. An apparatus, comprising:
a processor;
a memory that stores metadata about data being processed by the apparatus for a data storage device in a data storage system or information about an access pattern, a trend, a relationship, or a prediction concerning the data being processed by the apparatus for the data storage device;
a set of logics; and
an interface that connects the processor, the memory, and the set of logics;
the set of logics comprising:
a first logic that processes a current read request associated with the data being processed for the data storage device and updates observed input/output behavior for the data being processed and for the data storage device;
a second logic that makes a prediction about a future input/output request based, at least in part, on the current read request and the observed input/output behavior, and
a third logic that pre-fetches data from the data storage system or relocates data in the data storage system based, at least in part, on the prediction, and on a state of the data storage device, where the state of the data storage device varies.

29. The apparatus of claim 28, where the third logic relocates the electronic data and the additional electronic data to the same data storage device in the data storage system.

30. The apparatus of claim 28, where the third logic relocates the electronic data and the additional electronic data to different data storage devices in the data storage system.

31. The apparatus of claim 28, where the first logic updates the observed input/output behavior with respect to the temporal or spatial proximity of the data being processed and data previously processed for the data storage system.

32. The apparatus of claim 31, where the second logic makes the prediction based, at least in part, on the temporal or spatial proximity of the data being processed and additional electronic data in the data storage system.

33. The apparatus of claim 28, comprising a fourth logic that ingests newly arrived electronic data and targets the newly arrived electronic data to a location in the data storage system based, at least in part, on an attribute of the newly arrived electronic data or on a relationship between the newly arrived electronic data and previously processed electronic data in the data storage system.

34. The apparatus of claim 33, where the fourth logic performs speculative data deduplication and at least one of speculative erasure code production, or speculative error correction code production, based, at least in part, on an attribute of the newly arrived electronic data or on a relationship between the newly arrived electronic data and previously processed electronic data in the data storage system.

35. A system, comprising:
a computer that runs a predictive data placement process for a data storage device, where the process predicts a future input/output operation based on as-encountered data and historical data associated with a current input/output operation associated with the data storage device, and
a data storage efficiency apparatus that selectively relocates data on the data storage device based, at least in part, on the future input/output operation and on a property of the data storage device, where the property of the data storage device varies based on a state of the data storage device.

* * * * *